(12) United States Patent
Kim

(10) Patent No.: US 8,988,495 B2
(45) Date of Patent: Mar. 24, 2015

(54) IMAGE DISPLAY APPARATUS, METHOD FOR CONTROLLING THE IMAGE DISPLAY APPARATUS, AND IMAGE DISPLAY SYSTEM

(75) Inventor: Jeongsim Kim, Seoul (KR)

(73) Assignee: LG Eletronics Inc., Seoul (KR)

( * ) Notice: Subject to any disclaimer, the term of this patent is extended or adjusted under 35 U.S.C. 154(b) by 303 days.

(21) Appl. No.: 12/904,670

(22) Filed: Oct. 14, 2010

(65) Prior Publication Data

US 2011/0102544 A1  May 5, 2011

Related U.S. Application Data

(60) Provisional application No. 61/257,470, filed on Nov. 3, 2009.

(51) Int. Cl.
*H04N 15/00* (2006.01)
*H04N 13/00* (2006.01)
(Continued)

(52) U.S. Cl.
CPC ....... *H04N 13/0029* (2013.01); *H04N 13/0055* (2013.01); *H04N 13/0059* (2013.01);
(Continued)

(58) Field of Classification Search
None
See application file for complete search history.

(56) References Cited

U.S. PATENT DOCUMENTS

2002/0030675 A1\* 3/2002 Kawai ........................... 345/204
2002/0083447 A1\* 6/2002 Heron et al. ................... 725/38
(Continued)

FOREIGN PATENT DOCUMENTS

CN    1799267 A   7/2006
CN   101180880 A  5/2008
(Continued)

*Primary Examiner* — Anner Holder
*Assistant Examiner* — Ellyar Y Barazesh
(74) *Attorney, Agent, or Firm* — Birch, Stewart, Kolasch & Birch, LLP

(57) ABSTRACT

A method for controlling an image display apparatus includes determining a type of a video signal included in an input signal, determining whether three-dimensional (3D) format information is included in the input signal, if the video signal is a 3D video signal, requesting 3D format information about the video signal to a server that stores 3D format information, if the input signal does not include the 3D format information about the video signal, and processing, upon receipt of 3D format information from the server in response to the 3D format information request, the video signal according to the 3D format information and displaying a 3D image based on the processed video signal.

16 Claims, 17 Drawing Sheets

(51) Int. Cl.
  *H04N 13/04* (2006.01)
  *H04N 17/00* (2006.01)
  *H04N 17/02* (2006.01)
  *G06T 15/00* (2011.01)
  *G06K 9/00* (2006.01)
  *G01R 13/00* (2006.01)
  *G01R 29/26* (2006.01)
  *H04N 7/16* (2011.01)
  *H04N 13/02* (2006.01)

(52) U.S. Cl.
  CPC ......... *H04N13/0066* (2013.01); *H04N 13/026* (2013.01); *H04N 13/0497* (2013.01); *H04N 13/0452* (2013.01)
  USPC ................. 348/43; 348/42; 348/51; 348/181; 348/189; 345/419; 382/154; 702/69; 725/1; 725/2; 725/3; 725/4; 725/5; 725/6; 725/7; 725/8; 725/9; 725/10; 725/11; 725/12; 725/13; 725/14; 725/15; 725/16; 725/17; 725/18; 725/19; 725/20; 725/21; 725/22; 725/23; 725/24; 725/25; 725/26; 725/27; 725/28; 725/29; 725/30; 725/31; 725/32; 725/33; 725/34; 725/35; 725/36; 725/37; 725/38; 725/39; 725/40; 725/41; 725/42; 725/43; 725/44; 725/45; 725/46; 725/47; 725/48; 725/49; 725/50; 725/51; 725/52; 725/53; 725/54; 725/55; 725/56; 725/57; 725/58; 725/59; 725/60; 725/61; 725/62; 725/63; 725/64; 725/65; 725/66; 725/67; 725/68; 725/69; 725/70; 725/71; 725/72; 725/73; 725/74; 725/75; 725/76; 725/77; 725/78; 725/79; 725/80; 725/81; 725/82; 725/83; 725/84; 725/85; 725/86; 725/87; 725/88; 725/89; 725/90; 725/91; 725/92; 725/93; 725/94; 725/95; 725/96; 725/97; 725/98; 725/99; 725/100

(56) References Cited

U.S. PATENT DOCUMENTS

| | | |
|---|---|---|
| 2004/0075734 A1* | 4/2004 | Robinson et al. ............... 348/42 |
| 2004/0218269 A1* | 11/2004 | Divelbiss et al. ............. 359/464 |
| 2006/0139448 A1 | 6/2006 | Ha et al. |
| 2006/0269226 A1 | 11/2006 | Ito et al. |
| 2006/0288081 A1 | 12/2006 | Sung et al. |
| 2006/0290783 A1* | 12/2006 | Kubota et al. ................. 348/181 |
| 2007/0121182 A1* | 5/2007 | Fukushima et al. ............. 359/9 |
| 2008/0085049 A1* | 4/2008 | Naske et al. .................. 382/154 |
| 2008/0309755 A1 | 12/2008 | Yoshida et al. |
| 2009/0102914 A1* | 4/2009 | Collar et al. ..................... 348/46 |
| 2009/0203445 A1 | 8/2009 | Dohta et al. ..................... 463/39 |
| 2009/0219382 A1* | 9/2009 | Routhier et al. ................ 348/43 |
| 2009/0315980 A1* | 12/2009 | Jung et al. ........................ 348/43 |
| 2010/0103168 A1 | 4/2010 | Jung et al. ..................... 345/419 |
| 2010/0263003 A1* | 10/2010 | Gupta et al. ................. 725/104 |

FOREIGN PATENT DOCUMENTS

| | | |
|---|---|---|
| WO | WO 2007/010940 A1 | 1/2007 |
| WO | WO 2007/066868 A1 | 6/2007 |

\* cited by examiner (a)

(b)

(c)

(d)

(e)

IMAGE DISPLAY APPARATUS, METHOD FOR CONTROLLING THE IMAGE DISPLAY APPARATUS, AND IMAGE DISPLAY SYSTEM

CROSS-REFERENCE TO RELATED APPLICATION

This application claims the priority benefit of Provisional Patent Application No. 61/257,470, filed on Nov. 3, 2009, the disclosure of which is incorporated herein by reference.

BACKGROUND

1. Field

One or more embodiments described herein relate to an image display apparatus, a method for controlling the image display apparatus, and an image display system, and more particularly, to an image display apparatus, a method for controlling the image display apparatus, and an image display system, which can display a three-dimensional (3D) image despite no knowledge of the format of an input 3D video signal or despite input of a two-dimensional (2D) video signal.

2. Background

An image display apparatus has a function of displaying images viewable to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting such as robustness against noise, less data loss, ease of error correction, and the ability to provide high-definition, clear images. Digital broadcasting also has allowed interactive services for viewers.

However, as broadcast channels increase in number to meet various user demands, it takes much time for a viewer to select an intended channel from among various channels. Much time is also taken to switch to the selected channel, for displaying images of the selected channel.

Image signals that can be displayed on the image display apparatus are on the increase in type and number, and a variety of services are available though the image display apparatus. The resulting increase in number of buttons in a remote controller that operates the image display apparatus may give a feeling of inconvenience to the viewer. Accordingly, many techniques are under study, including a User Interface (UI) to efficiently control the image display apparatus and increase user convenience.

DETAILED DESCRIPTION

Exemplary embodiments of the present invention will be described below with reference to the attached drawings.

The terms "module" and "portion" attached to describe the names of components are used herein to help the understanding of the components and thus they should not be considered as having specific meanings or roles. Accordingly, the terms "module" and "portion" may be interchangeable in their use.

Figure 1:
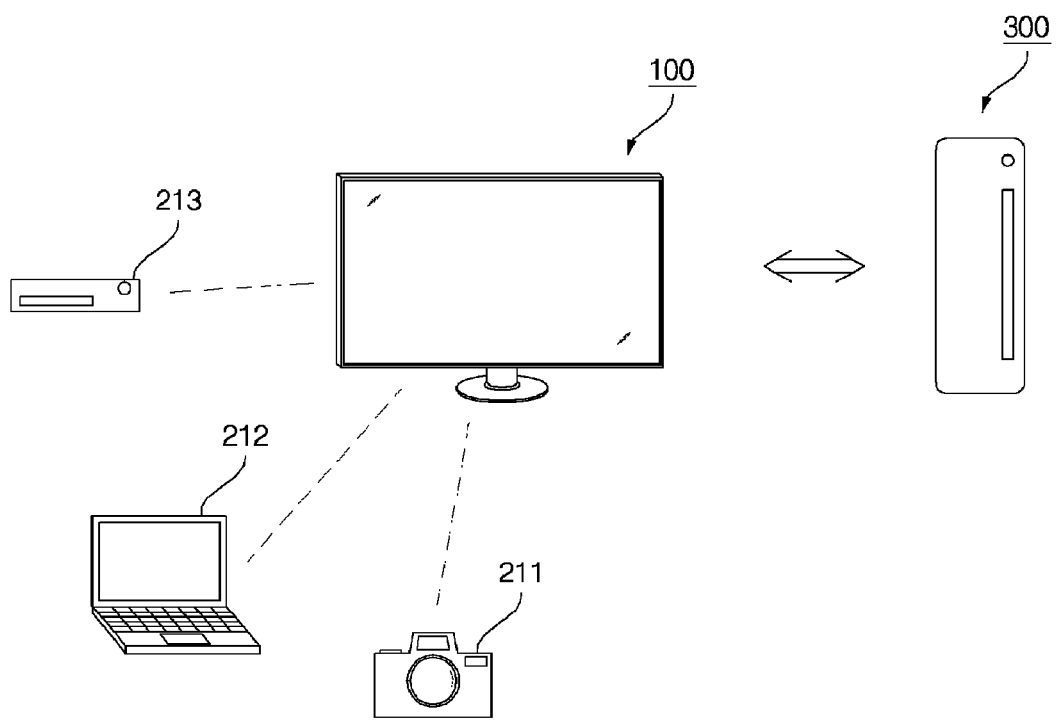
FIG. 1 is a perspective view illustrating an image display apparatus and a pointing device according to an exemplary embodiment of the present invention.

An image display apparatus 100 is a device that displays an image based on an input video signal. The image display apparatus 100 may receive a broadcast signal from a broadcasting station and display an image based on a video signal included in the received broadcast signal. The image display apparatus 100 may be connected to external devices wirelessly or wiredly and thereby display images based on video signals received from the connected external devices. The external devices may be a camera 211, a laptop computer 212, and a Blueray Disc (BD)/Digital Versatile Disc (DVD) player 213, as illustrated in FIG. 1.

These external devices 211, 212 and 213 may transmit a signal including a 2D or 3D video signal to the image display apparatus 100. The 2D video signal refers to a video signal from which a 2D image is realized, whereas the 3D video signal refers to a video signal from which a 3D image is realized.

The image display apparatus 100 may receive content-related signals including 2D video signals from the external devices 211, 212 and 213, a broadcasting station, or a content provider connected over a network. In accordance with an exemplary embodiment, the image display apparatus 100 may convert a 2D video signal to a 3D video signal. In general, a 3D video signal includes depth information that gives a sense of depth to an object included in an image realized from the 3D video signal. The image display apparatus 100 may access a server 300 that stores depth information required for 2D-3D conversion, receive depth information matching to a content including an input 2D video signal, and convert the input 2D video signal to a 3D video signal, referring to the depth information. Thus, a 3D image is created based on the 3D video signal.

As stated before, the image display apparatus 100 may receive a content-related signal including a 3D video signal from the external devices 211, 212 and 213, a broadcasting station, or a content provider connected over a network. The format of a 3D video signal varies with the layout of multi-viewpoint images, for example, left-eye and right-eye images of a 3D image that is created based on the 3D video signal. The format of the 3D video signal may be known from a data signal received along with the 3D video signal. If the image display apparatus 100 fails to identify the format of an input 3D video signal, it may access the server 300 that stores 3D format information on a content basis, receive 3D format information about the content from the server 300, and process the input 3D video signal referring to the 3D format information, thereby creating a 3D image.

Figure 2:
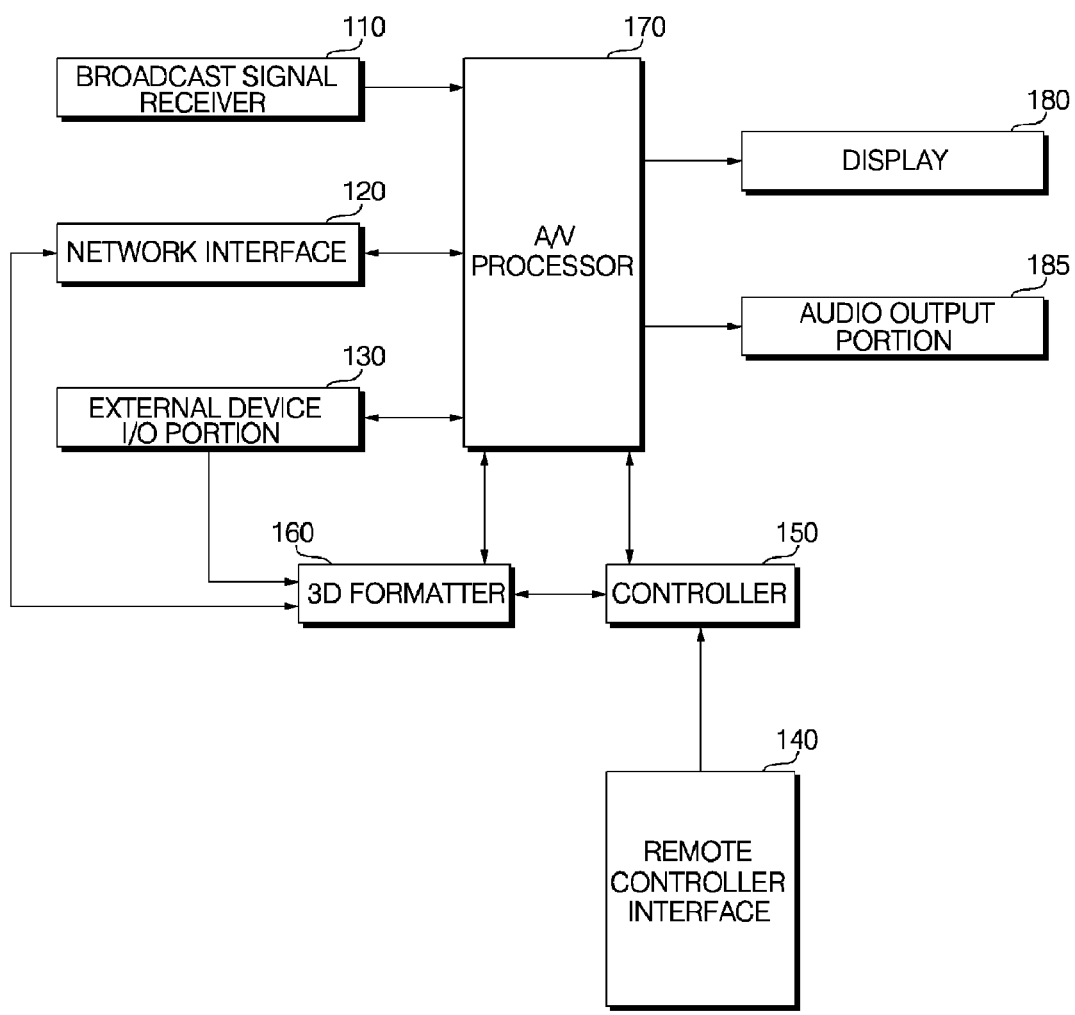
FIGS. 2 and 3 are block diagrams of an image display apparatus according to an exemplary embodiment of the present invention.

FIG. 2 is a block diagram of an image display apparatus according to an exemplary embodiment of the present invention.

Referring to FIG. 2, the image display apparatus 100 according to the exemplary embodiment of the present invention includes a broadcast signal receiver 110, a network interface 120, an external device Input/Output (I/O) portion 130, a remote controller interface 140, a controller 150, a 3D formatter 160, an Audio/Video (A/V) processor 170, a display 180, and an audio output portion 185.

The broadcast signal receiver 110 may receive an RF broadcast signal corresponding to a channel selected by the user or an RF broadcast signal corresponding to every preliminarily memorized channel from among a plurality of RF broadcast signals received through an antenna, downconverts the received RF broadcast signal to a digital Intermediate Frequency (IF) signal or an analog baseband A/V signal, and outputs the digital IF signal or the analog baseband A/V signal to the A/V processor 170.

The broadcast signal receiver 110 may be able to receive RF broadcast signals from an Advanced Television Systems Committee (ATSC) single-carrier system or from a Digital Video Broadcasting (DVB) multi-carrier system. The broadcast signal receiver 110 may sequentially or periodically select a number of RF broadcast signals corresponding to a number of preliminarily memorized broadcast channels by a channel-add function from among a plurality of RF signals received through the antenna and downconvert the selected RF broadcast signals to IF signals or baseband A/V signals. This operation is performed to display a thumbnail list including a plurality of thumbnail images corresponding to the preliminarily memorized broadcast channels on the display 180. Thus, it is possible to receive the RF broadcast signal corresponding to the selected channel, or to receive the RF broadcast signals corresponding to all of the preliminarily memorized channels sequentially or periodically.

The network interface 120 interfaces the image display apparatus 100 with a wired/wireless network including the Internet.

The network interface 120 may include a wireless communication module for connecting the image display apparatus 100 wirelessly to the Internet. For the wireless Internet access, the wireless communication module may operate based on a communication standard such as Wireless Local Area Network (WLAN) (i.e., Wi-Fi), Wireless Broadband (Wibro), World Interoperability for Microwave Access (WiMax), or High Speed Downlink Packet Access (HSDPA).

The network interface 120 may receive contents or data from a content provider or a network operator over the network, specifically contents such as broadcasting, games, Video On Demand (VOD), broadcast signals, etc. and information related to the contents. The network interface 120 may also receive firmware update information and update files from a network operator.

The external device I/O portion 130 may connect the image display apparatus 100 to external devices. For the connection between the image apparatus 100 and the external devices, the external device I/O portion 130 may include an A/V I/O portion or a wireless communication module.

The external device I/O portion 130 is connected wirelessly or wiredly to an external device such as a Digital Versatile Disc (DVD), a Bluray disc, a gaming device, a camera, a camcorder, or a computer (e.g., a laptop computer). Then, the external device I/O portion 130 externally receives video, audio, and/or data signals from the external device and transmits the received external input signals to the A/V processor 170 of the image display apparatus 100. In addition, the external device I/O portion 130 may output video, audio, and data signals processed by the A/V processor 170 to the external device.

In order to transmit A/V signals received from the external device to the image display apparatus 100, the A/V I/O portion of the external device I/O portion 130 may include an Ethernet port, a Universal Serial Bus (USB) port, a Composite Video Banking Sync (CVBS) port, a component port, a Super-video (S-video) (analog) port, a Digital Visual Interface (DVI) port, a High Definition Multimedia Interface (HDMI) port, a Red-Green-Blue (RGB) port, and a D-sub port.

The wireless communication module of the external device I/O portion 130 may wirelessly communicate with another electronic device. For the wireless communication, the image display apparatus 100 may be connected to another electronic device by Bluetooth, Radio-Frequency IDentification (RFID), Infrared Data Association (IrDA), Ultra WideBand (UWB), or ZigBee.

The external device I/O portion 130 may be connected to various set-top boxes through at least one of the Ethernet port, the USB port, the CVBS port, the component port, the S-video port, the DVI port, the HDMI port, the RGB port, and the D-sub port and may thus receive data from or transmit data to the various set-top boxes.

For example, when connected to an Internet Protocol Television (IPTV) set-top box, the external device I/O portion 130 may transmit video, audio and data signals processed by the IPTV set-top box to the A/V processor 170 and may transmit various signals received from the A/V processor 170 to the IPTV set-top box, for interactive communication.

The term 'IPTV' as used herein may cover a broad range of services depending on transmission networks, such as Asynchronous Digital Subscriber Line-TV (ADSL-TV), Very High Speed Digital Subscriber Line-TV (VDSL-TV), Fiber To The Home-TV (FTTH-TV), TV over Digital Subscriber Line (DSL), Video over DSL, TV over IP (TVIP), Broadband TV (BTV), and Internet TV and full-browsing TV, which are capable of providing Internet-access services.

The external device I/O portion 130 may be connected to a communication network that enables voice calls or video calls. The communication network may be any of a broadcasting communication network, a Public Switched Telephone Network (PSTN), and a mobile communication network.

The remote controller interface 140 may include a wireless communication module which wirelessly transmits signals to and/or wirelessly receives signals from a remote controller, and a coordinate calculator which calculates pointer coordinates representing a target point on the display 180 to which a pointer should be moved in accordance with the movement of the remote controller. The remote controller interface 140 may wirelessly transmit RF signals to and/or wirelessly receive RF signals from the remote controller through an RF module. Also, the remote controller interface 140 may wirelessly transmit IR signals to and/or wirelessly receive IR signals from the remote controller through an IR module.

The coordinate calculator of the remote controller interface 140 may receive motion information regarding the movement of the remote controller from the wireless communication module of the remote controller and may calculate pointer coordinates representing a target point to which the pointer should be shifted on a screen of the display 180 by correcting the motion information for a user's handshake or possible errors.

A signal received in the image display apparatus 100 from the remote controller through the remote controller interface 140 is output to the controller 150. Then, the controller 150 may acquire information regarding the movement of the remote controller and information regarding a key manipulation detected from the remote controller from the signal received from the remote controller interface 140, and may control the image display apparatus 100 based on the acquired information.

Alternatively, the remote controller 200 may calculate the pointer coordinates corresponding to the movement of the remote controller and output the calculated pointer coordinates to the remote controller interface 140. The remote controller interface 140 may transmit the received pointer coordinates to the controller 150 without correcting a user's handshake or possible errors.

The controller 150 provides overall control to the image display apparatus 100. The controller 150 may receive a signal from the remote controller through the remote controller interface 140. Also, the controller 150 may receive a command by input of a local key provided in the image display apparatus 100. The controller 150 identifies a command included in the received signal or a command corresponding to the local key manipulation and controls the image display apparatus 100 to operate according to the command.

For example, upon receipt of a command to select a specific channel from the user, the controller 150 controls the broadcast signal receiver 110 to receive a broadcast signal on the selected channel. The controller 150 also controls the A/V processor 170 to process audio and video signals of the broadcast signal received on the selected channel and to output information about the user-selected channel along with the audio and video signals to the audio output portion 185 and the display 180, respectively.

In another example, the user may enter a command to output a different type of A/V signal to the image display apparatus 100 by the remote controller. The user may want to view a video signal received from a camera or a camcorder through the external device I/O portion 130. Then the controller 150 may control the A/V processor 170 to output an A/V signal received through the USB port of the external device I/O portion 130 to the audio output portion 185 or the display 180.

The 3D formatter 160 identifies the type of a video signal included in a signal received from the broadcast signal receiver 110, the network interface 120, or the external device I/O portion 130. If the received video signal is a 3D video signal from which a 3D image can be realized, the 3D formatter 160 identifies the format of the 3D video signal. Specifically, the 3D formatter 160 refers to a data signal related to the input 3D video signal in identifying the format of the 3D video signal.

If the 3D formatter 160 fails to identify the format of the 3D video signal from the data signal, it outputs a 3D format request signal to the server 300 through the network interface 120. The server 300 transmits 3D format information to the image display apparatus 100 in response to the 3D format request signal. The 3D formatter 160 may receive the 3D format information from the server 300 through the network interface 120.

The 3D formatter 160 determines the format of the 3D video signal included in the signal received through the broadcast signal receiver 110, the network interface 120, or the external device I/O portion 130, referring to the received 3D format information. The 3D formatter 160 notifies the A/V processor 170 of the determined 3D format. The A/V processor 170 processes the input 3D video signal according to the 3D format.

If a 2D video signal is included in the signal received through the broadcast signal receiver 110, the network interface 120, or the external device I/O portion 130, the 3D formatter 160 transmits a depth information request signal to the server 300 through the network interface 120, to request depth information required for 2D-3D conversion. The 3D formatter 160 receives the requested depth information from the server 300 through the network interface 120 and converts the 2D video signal to a 3D video signal of a predetermined format based on the depth information. The 3D formatter 160 transmits the 3D video signal to the A/V processor 170. The A/V processor 170 processes the 3D video signal and displays a 3D image based on the processed 3D video signal on the display 180.

In accordance with an exemplary embodiment, the image display apparatus 100 may further include a User Interface (UI) controller. The UI controller creates a Graphic UI (GUI) related to the image display apparatus 100 and outputs the GUI to the display 180 or the audio output portion 185 through the A/V processor 170. The GUI may be changed based on a command included in a signal received from the remote controller, a command received by input of a local key provided in the image display apparatus 100, or an operation of the image display apparatus 100.

For example, upon receipt of a signal from the remote controller, the UI controller may generate a pointer video signal corresponding to the movement of the remote controller and output the pointer video signal to the A/V processor 170. The controller 150 may calculate pointer coordinates representing a target point to which the pointer should be shifted according to the signal received from the remote controller and output information about the calculated pointer coordinates to the UI controller. The UI controller may generate the pointer video signal based on the received pointer coordinate information. The A/V processor 170 processes the pointer video signal so that the pointer is displayed on the display 180 in correspondence with the pointer video signal. The pointer displayed on the display 180 moves according to the movement of the remote controller.

In another example, the UI controller may generate a UI video signal for a UI including an object according to a command included in a signal received through the pointing device, a command received by input of a local key, or an operation of the image display apparatus 100 and output the UI video signal to the A/V processor 170.

Objects may include various types of widgets by which commands are entered to the image display apparatus 100 or information related to the image display apparatus 100 is provided to the user. The widgets may be displayed in On Screen Display (OSD).

The objects include images or text that provides information about the image display apparatus 100 or an image displayed on the image display apparatus 100, such as a sound output (volume) level, channel information, current time, etc. The objects may be implemented into any other type (e.g. moving pictures) depending on the type of information that can be or should displayed on the image display apparatus 100, and it is to be understood that the objects described in this exemplary embodiment do not limit the present invention.

A widget is an element that enables the user to change specific data in a GUI on his own. For instance, the widget may be one of a sound volume button, a channel button, a menu, an icon, a navigation tab, a scroll bar, a progress bar, a text box, and a window which are displayed on the display 180. The type of a widget implemented in the image display apparatus 100 may vary with the specification of a GUI that can be or should be realized in the image display apparatus 100. The widgets of this exemplary embodiment should not be construed as limiting the present invention.

The A/V processor 170 processes an A/V signal included in a signal received through the broadcast signal receiver 110, the network interface 120, or the external device I/O portion 130 to be suitable for the display 180. The A/V processor 170 may process the A/V signal based on information included in a data signal received along with the A/V signal.

The A/V processor 170 processes an A/V signal received through the UI controller such that the A/V signal can be output to the audio output portion 185 or the display 180. The user may identify the operational status of the image display apparatus 100 or enter a command related to the image display apparatus 100 on the GUI displayed on the display 180 based on the A/V signal generated from the UI controller.

The A/V processor 170 may select an A/V signal to be processed according to a user command received from the controller 150. The A/V signal processed by the A/V processor corresponds to a sound or an image to be output through the audio output portion 185 or the display 180. Commands received through the controller 150 may include a broadcast channel selection command, a command to select a content to be played from among contents input to the image display apparatus 100, etc.

In this exemplary embodiment, the A/V processor 170 may process a video signal such that an external input 2D or 3D video signal can be displayed on the display 180. The A/V processor 170 may process a video signal such that a UI created by the UI controller can be displayed with the illusion of 3D on the display 180. The A/V processor 170 will be described later in detail with reference to FIG. 3.

The display 180 generates driving signals by converting a video signal, a data signal, and an OSD signal processed in the A/V processor 170 or a video signal and a data signal received from the external device I/O portion 130 to RGB signals. The display 180 may be implemented into a Plasma Display Panel (PDP), a Liquid Crystal Display (LCD), an Organic Light Emitting Diode (OLED), or a flexible display. In an exemplary embodiment of the present invention, it is preferable to configure the display 180 to be capable of 3D display.

3D display techniques may be categorized into auto stereoscopic display techniques and binocular stereoscopic display techniques according to how the user perceives 3D images.

The auto stereoscopic display techniques realize 3D images in a display without using an auxiliary device. The user may view 3D images on an auto stereoscopic display without using an auxiliary device (e.g. polarized glasses). The auto stereoscopic display techniques include a lenticular type, a parallax barrier type, etc.

The binocular stereoscopic display techniques realize 3D images with use of an auxiliary device. A Head Mounted Display (HMD) type and a glasses type fall within the binocular stereoscopic display techniques. A glasses-type display requires glasses such as polarized glasses, shutter glasses, a spectrum filter, etc.

The display 180 may also be implemented as a touch screen so that it is used not only as an output device but also as an input device.

The audio output portion 185 receives an audio signal processed by the A/V processor 170, for example, a stereo signal, a 3.1 channel signal, or a 5.1 channel signal and outputs the audio signal as voice or sound. The audio output portion 185 may be implemented into various types of speakers.

Figure 3:
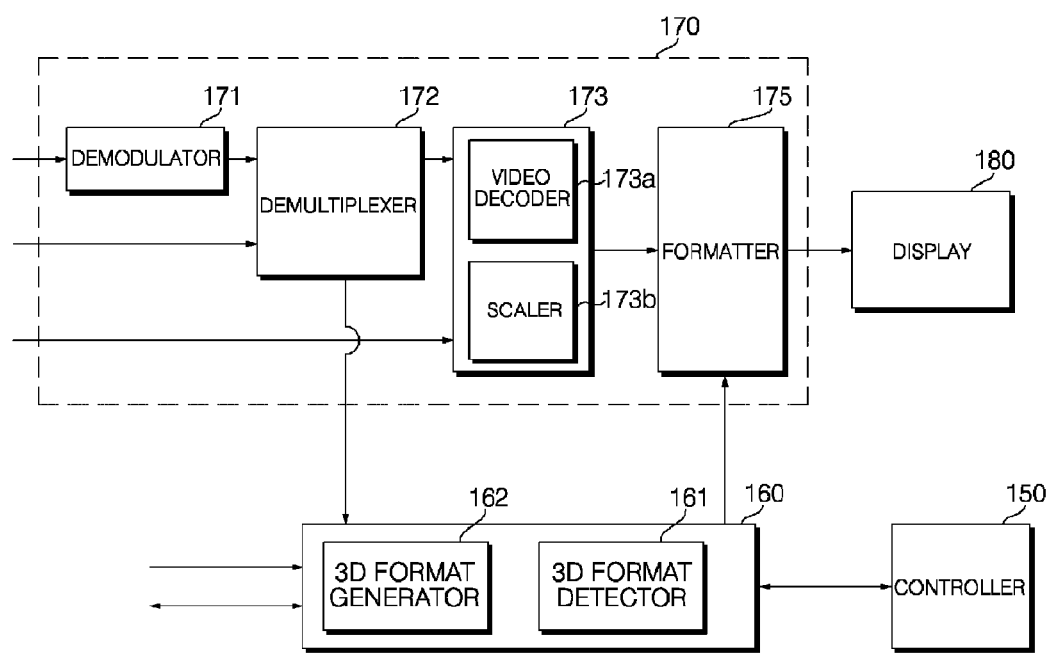

FIG. 3 is a block diagram of the A/V processor 170 in the image display apparatus 100 according to an exemplary embodiment of the present invention.

The A/V processor 170 may include a demodulator 171, a demultiplexer 172, a decoder 173, and a formatter 175.

The demodulator 171 may demodulate a broadcast signal received from the broadcast signal receiver 110. For example, the demodulator 171 may receive a digital IF signal DIF from the broadcast signal receiver 110 and demodulate the digital IF signal DIF. The demodulator 171 may also perform channel decoding. For the channel decoding, the demodulator 171 may include a convolutional decoder (not shown), a deinterleaver (not shown) and a Reed-Solomon decoder (not shown) and perform convolutional decoding, de-interleaving and Reed-Solomon decoding.

The demodulator 171 may perform demodulation and channel decoding on the digital IF signal received from the broadcast signal receiver 110, thereby obtaining a stream signal TS. The stream signal TS may be a signal in which a video signal, an audio signal and a data signal are multiplexed. For example, the stream signal TS may be a Moving Picture Experts Group-2 (MPEG-2) Transport Stream (TS) obtained by multiplexing an MPEG-2 video signal and a Dolby AC-3 audio signal. The MPEG-2 TS may include a 4-byte header and a 184-byte payload.

In order to properly handle not only ATSC signals but also DVB signals, the demodulator 171 may include an ATSC demodulator and a DVB demodulator.

The demodulator 171 may output the stream signal TS to the demultiplexer 172.

The demultiplexer 172 may demultiplex the input stream signal TS, for example, an MPEG-2 TS into an audio signal, a video signal, and a data signal. The demultiplexer 172 may receive the stream signal from the demodulator 171, the network interface 120, or the external device I/O portion 130.

The data signal obtained by demultiplexing the input stream signal may be an encoded data signal. The encoded data signal may include Electronic Program Guide (EPG) information that provides broadcasting information such as the start and end times of broadcast programs played on each broadcast channel. For instance, the EPG information may be ATSC-Program and System Information Protocol (ATSC-PSIP) information in case of ATSC, whereas it may be DVB-Service Information (DVB-SI) in case of DVB.

The decoder 173 may decode the demultiplexed signals. In this exemplary embodiment, the decoder 173 may include a video decoder 173a for decoding the demultiplexed video signal, and a scaler 173b for controlling the resolution of the decoded video signal to a resolution level at which the decoded video signal can be output in the image display apparatus 100.

The image display apparatus 100 which has the UI controller may further include a mixer (not shown) for mixing a decoded video signal received from the decoder 173 with a UI video signal generated by the UI controller. The mixer mixes the video signal received from the external device with the video signal generated in the UI controller and outputs the mixed video signal to the formatter 175. The display 180 displays an image based on the mixed video signal.

The formatter 175 may identify the format of an input video signal, referring to a data signal related to the input video signal. The formatter 175 may convert the input video signal to a format suitable for the display 180 and output the converted video signal to the display 180.

In this exemplary embodiment, the image display apparatus 100 may display a 3D image on the display 180. The formatter 175 may separate the input video signal into multi-viewpoint images and create a 3D video signal of a predetermined format with the multi-viewpoint images. The formatter 175 outputs the 3D video signal to the display 180, and the display 180 displays a 3D image based on the 3D video signal.

A 3D image is composed of multi-viewpoint images. The user may view the multi-viewpoint images with his left and right eyes. The disparity between the multi-viewpoint images viewed by the left and right eyes gives the illusion of 3D to the user. The multi-viewpoint images that form the 3D image are generally a left-eye image perceivable to the left eye and a right-eye image perceivable to the right eye.

Figure 4:
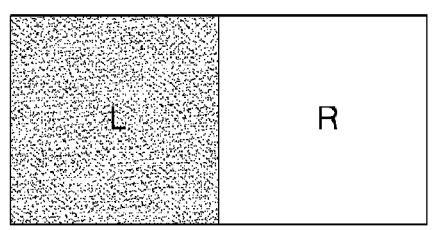
FIG. 4 illustrates three-dimensional (3D) image formats available to the image display apparatus illustrated in FIGS. 2 and 3.
Figure 4:
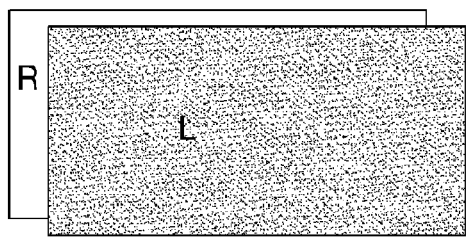
Figure 4:
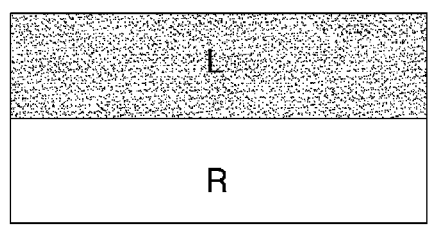
Figure 4:
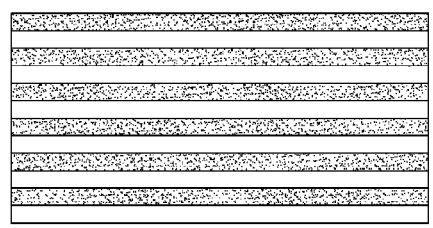
Figure 4:
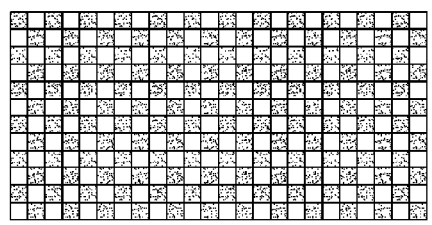

FIG. 4 illustrates exemplary 3D formats in which 3D images may be realized. The 3D formats are classified according to layouts of left-eye and right-eye images that form a 3D image.

Referring to FIG. 4(a), the left-eye and right-eye images are disposed on the left and right sides, respectively. This is called a side-by-side format.

Referring to FIG. 4(b), the left-eye and right-eye images are arranged vertically in a top/down format.

Referring to FIG. 4(c), a time-division layout of the left-eye and right-eye images is called a frame sequential format.

Referring to FIG. 4(d), the left-eye and right-eye images alternate with each other on a line-by-line basis. This is called an interlaced format.

Referring to FIG. 4(e), the left-eye and right-eye images are mixed in the form of boxes in a checker box format.

A video signal included in a signal received from an external device may be a 3D video signal from which a 3D image is created. If the image display apparatus 100 includes the UI controller, a GUI signal created by the UI controller may be a 3D video signal with which a 3D image can be realized. The mixer may mix these 3D video signals and output the mixed 3D video signal to the formatter 175.

The formatter 175 may identify the format of the mixed 3D video signal referring to a related data signal. The formatter 175 may process the 3D video signal according to the identified format and output the processed 3D video signal to the display 180. If limited 3D formats are available to the display 180, the formatter 175 may convert the received 3D video signal to a 3D format in which the display 180 can display a 3D image and output the converted 3D video signal to the display 180.

In some cases, the format of the 3D video signal input to the formatter 175 may not be identified using the related data signal. For example, if metadata or SI information carried in a data signal related to the input 3D video signal does not include information about the format of the 3D video signal, the format of the input 3D video signal may be determined.

Then a 3D format detector 161 of the 3D formatter 160 transmits a 3D format request signal regarding the 3D video signal input to the image display apparatus 100 to the server 300. The 3D formatter detector 161 determines the format of the 3D video signal based on 3D format information that has been received from the server 300 in response to the 3D format request signal. The 3D format detector 161 notifies the formatter 175 of the determined 3D format. The formatter 175 processes the 3D video signal based on the 3D format and displays a 3D image on the display 180.

When requesting the 3D format information to the server 300, the 3D format detector 161 collects title information regarding a content including the 3D video signal and includes the title information in the 3D format request signal. The title information may include the title, producer name, casting information, and Internet Movie DataBase (IMDB) information of the content. The server 300 stores 3D format information on a title information basis. The server 300 transmits 3D format information matching to the title information included in the received 3D format request signal to the image display apparatus 100.

If the formatter 175 receives a 2D signal, the 3D format generator 162 of the 3D formatter 160 requests depth information to the server 300, for 2D-3D conversion. The server 300 stores depth information required for 2D-3D conversion on a content basis. The server 300 transmits the requested depth information to the image display apparatus 100. The 3D formatter generator 162 converts the 2D video signal to a 3D video signal of a predetermined format based on the depth information and outputs the 3D video signal to the formatter 715. The formatter 175 processes the 3D video signal and displays a 3D image on the display 180.

The 3D format generator 162 may collect title information regarding a content including the 2D video signal and includes the title information in the depth information request signal. The title information may include the title, producer name, casting information, and IMDB information of the content. The server 300 stores depth information on a title information basis. The server 300 transmits depth information matching to the title information included in the received depth information request signal to the image display apparatus 100.

Figure 5:
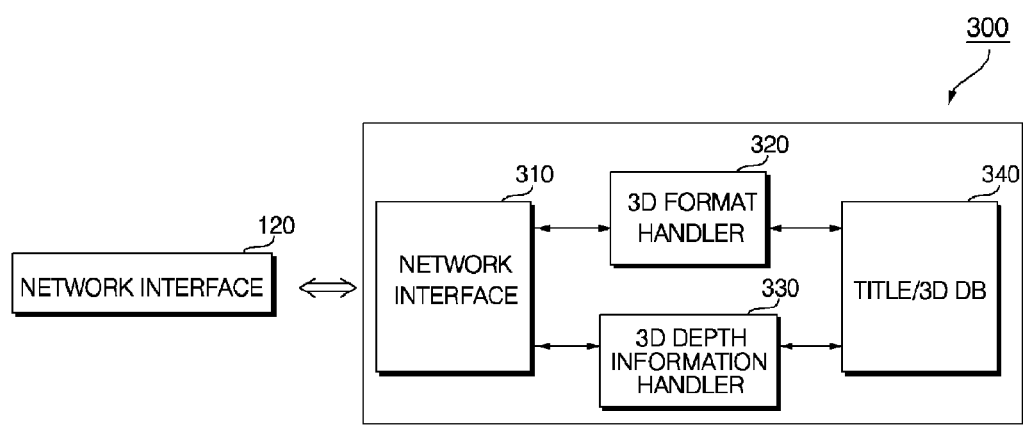
FIG. 5 is a block diagram of a server according to an exemplary embodiment of the present invention.

FIG. 5 is a block diagram of the server 300 for transmitting 3D format information or depth information to the image display apparatus 100 according to an exemplary embodiment of the present invention.

Referring to FIG. 5, the server 300 includes a network interface 310, a 3D format handler 320, a 3D depth information handler, and a title/3D DataBase (DB) 340.

The network interface 310 transmits signals to and/or receives signals from the network interface 120 of the image display apparatus 100. For example, a 3D format request signal or a depth information request signal is transmitted to the network interface 310 of the server 300 through the network interface 120 of the image display apparatus 100. The server 300 transmits 3D format information or depth information in response to the 3D format request signal or the depth information request signal to the network interface 120 of the image display apparatus 100 through the network interface 310.

The 3D format handler 320 searches the title/3D DB 340 for 3D format information matching to title information included in the 3D format request signal and transmits a response signal carrying the 3D format information to the image display apparatus 100 in response to the 3D format request signal. The image display apparatus 100 processes a 3D video signal according to the 3D format information included in the response signal.

The 3D depth information handler 330 searches the title/3D DB 340 for depth information matching to title information included in the depth information request signal and transmits a response signal carrying the depth information to the image display apparatus 100 in response to the depth information request signal. The image display apparatus 100 converts a 2D video signal to a 3D video signal according to the depth information included in the response signal.

Figure 6A:
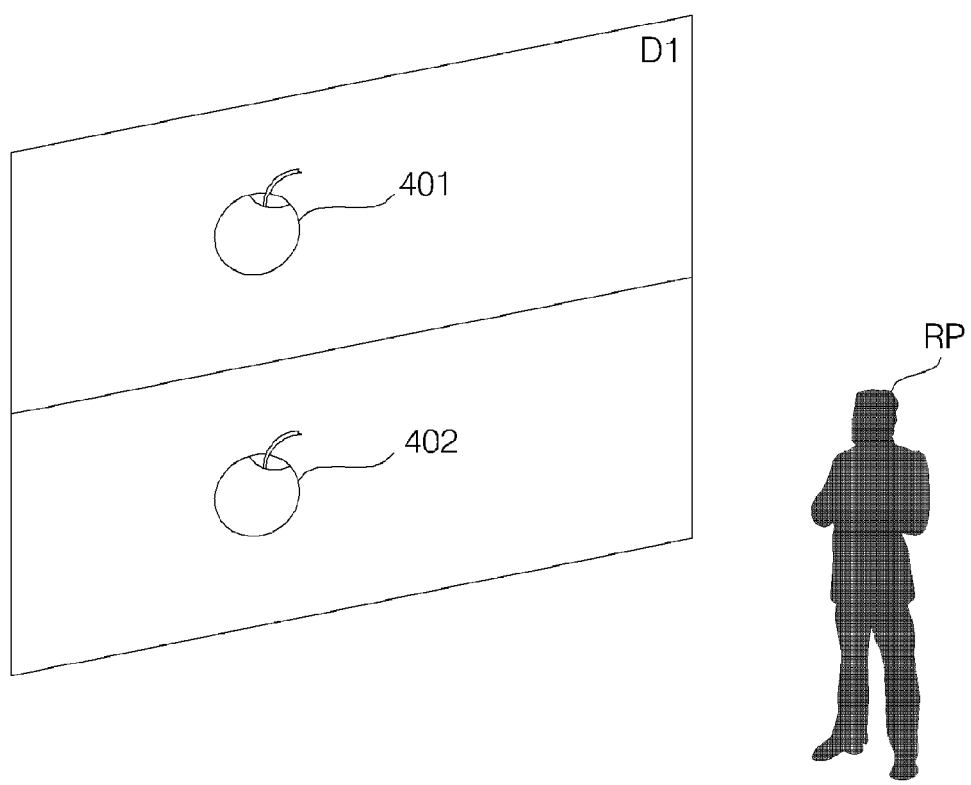
FIGS. 6A to 7B illustrate examples of a screen displayed in the image display apparatus illustrated in FIGS. 3 and 4.
Figure 6B:
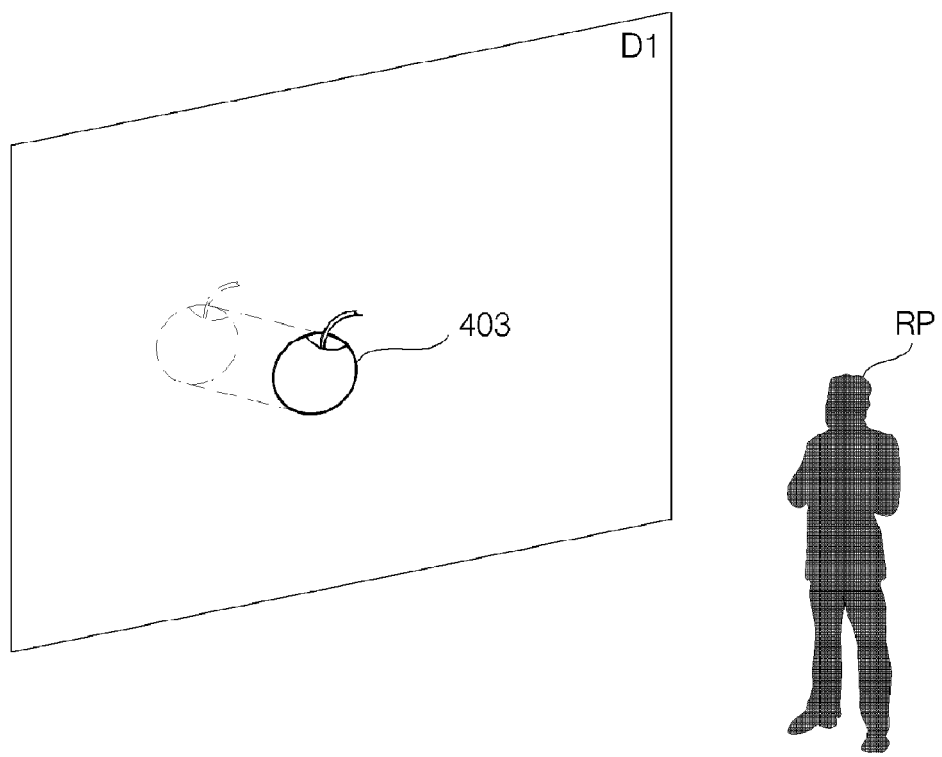

FIGS. 6A and 6B are views referred to for describing screens displayed in the image display apparatus according to an exemplary embodiment of the present invention.

In the exemplary embodiment, a 3D video signal of the top/down format is input to the image display apparatus 100. FIG. 6A illustrates images displayed on a display plane D1 of the display 180, when image reproduction is discontinued in the image display apparatus 100. Since left-eye and right-eye images are arranged up and down in the top/down format, the discontinued image reproduction results in displaying the left-eye and right-eye images separately up and down, as illustrated in FIG. 6A.

A 3D object is an object giving the illusion of 3D to which a video signal is processed by the A/V processor 170. The depth of the 3D object may be controlled according to the disparity between multi-viewpoint images of the 3D object. In this case, the disparity between the multi-viewpoint images of the 3D object may correspond to the depth of the 3D object. Left-eye and right-eye images 401 and 402 that are combined to a 3D object are displayed on the display plane D1 of the display 180 in the exemplary embodiment.

FIG. 6B illustrates an image viewed by the user, when image reproduction is performed in the image display apparatus 100. During image reproduction, a 3D object 403 to which the left-eye and right-eye images 401 and 402 are combined appears protruding toward a specific Reference Point (RP). In this exemplary embodiment, the RP is the user.

In an exemplary embodiment, a data signal related to a 3D video signal input to the image display apparatus 100 does not include information about the format of the 3D video signal. Thus, the 3D format detector 161 of the 3D formatter 160 transmits a 3D format request signal regarding the 3D video signal to the server 300 and outputs 3D format information included in a response signal that is received from the server 300 in response to the 3D format request signal to the formatter 175. The formatter 175 processes the input 3D video signal based on the 3D format information and outputs the processed 3D video signal to the display 180. The display 180 displays a 3D image corresponding to the 3D video signal, as illustrated in FIG. 6B.

Figure 7A:
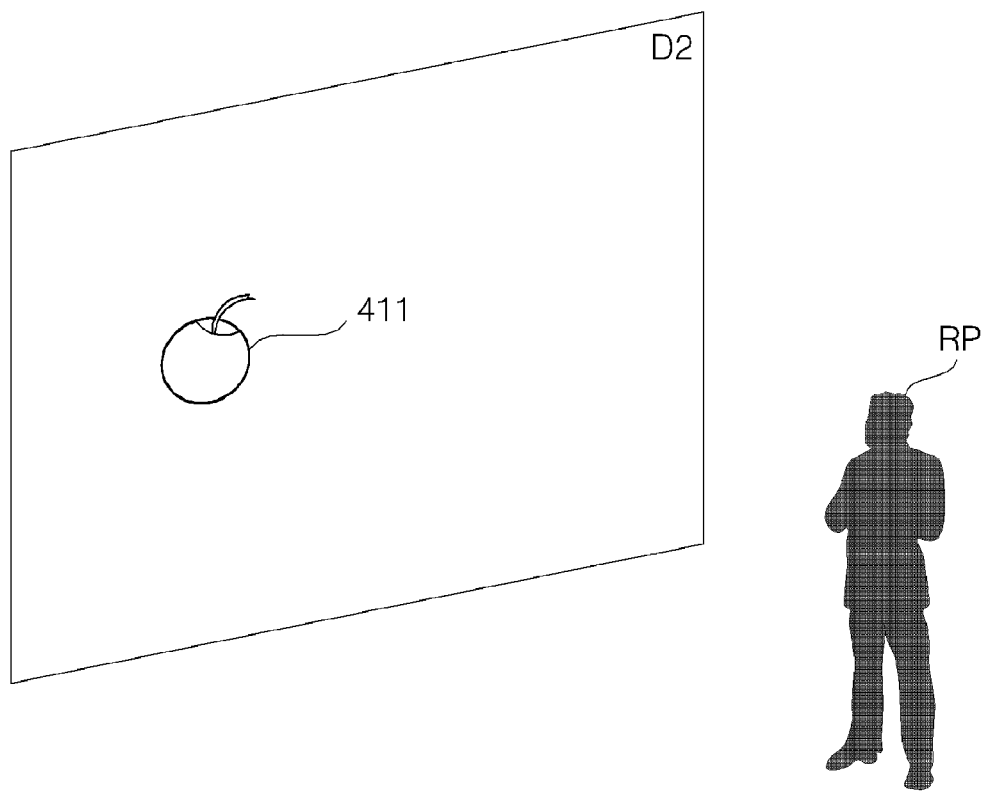
Figure 7B:
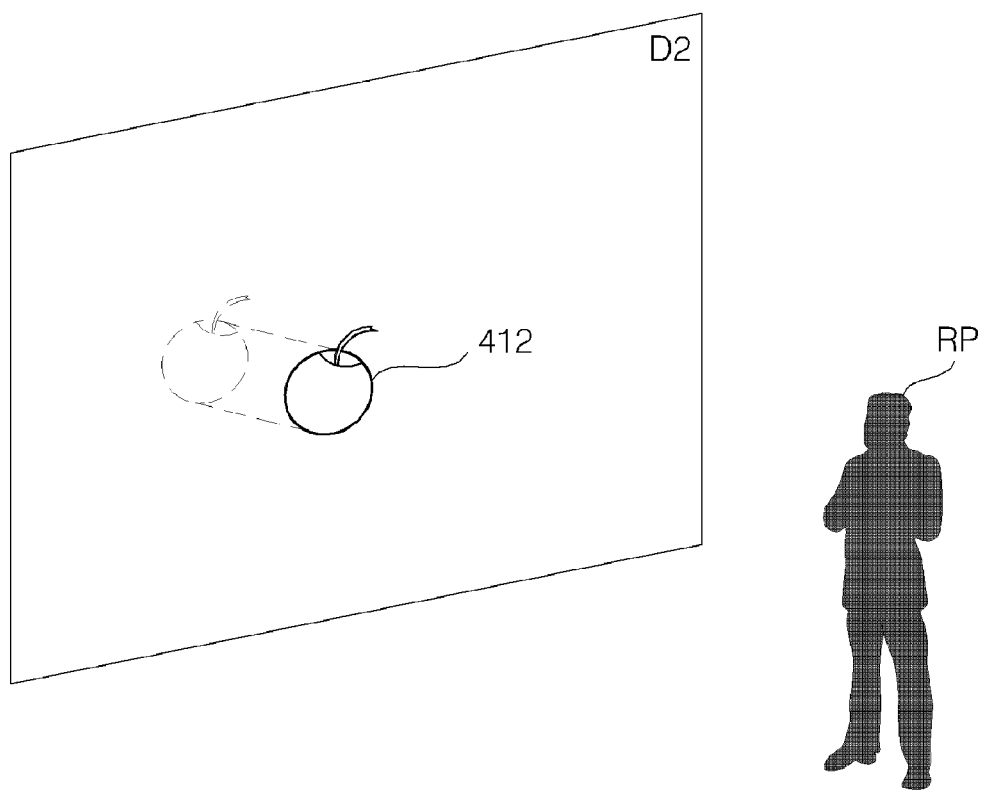

FIGS. 7A and 7B are views referred to for describing screens displayed in the image display apparatus 100 according to an exemplary embodiment of the present invention.

In this exemplary embodiment, a 2D video signal is input to the image display apparatus 100. In the absence of depth information about the 2D video signal, the A/V processor 170 displays an object 411 corresponding to the 2D video signal on a display plane D2 of the display 180, as illustrated in FIG. 7A.

In this case, the 3D format generator 162 may transmit a depth information request signal regarding the 2D video signal to the server 300 and converts the 2D video signal to a 3D video signal based on depth information included in a response signal that is received from the server 300 in response to the depth information request signal. The 3D format generator 162 outputs the 3D video signal to the formatter 175.

The formatter 175 processes the input 3D video signal and outputs the processed 3D video signal to the display 180 so that a 3D object 412 is displayed looking protruding toward the user RP, as illustrated in FIG. 7B.

Figure 8:
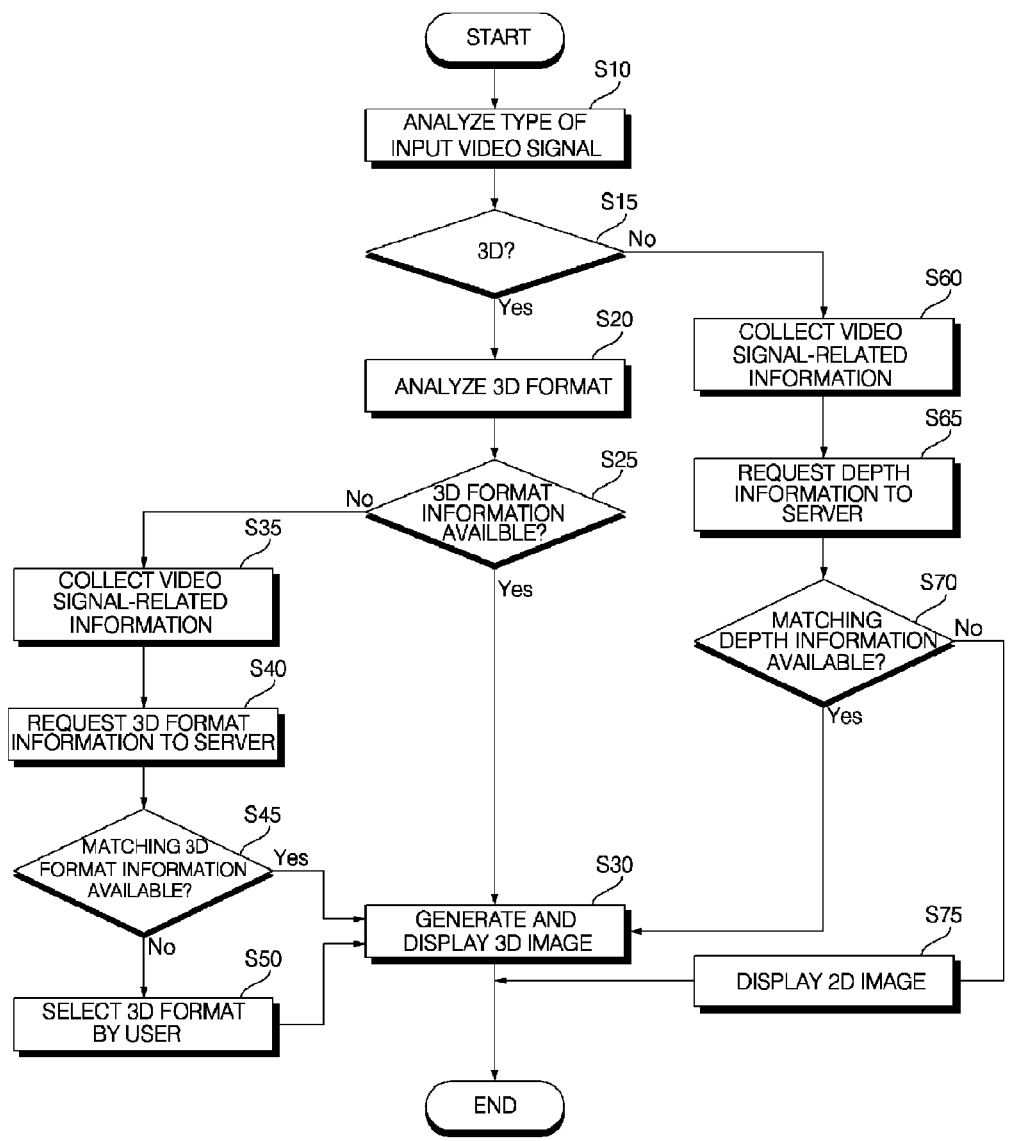
FIGS. 8 and 9 are flowcharts illustrating a method for operating the image display apparatus according to an exemplary embodiment of the present invention.

FIG. 8 is a flowchart illustrating a method for operating the image display apparatus 100 according to an exemplary embodiment of the present invention.

Referring to FIG. 8, the image display apparatus 100 may receive a signal including a video signal through the broadcast signal receiver 110, the network interface 120, or the external device I/O portion 130. The image display apparatus 100 analyzes the type of the video signal included in the input signal in step S10.

In step S15, the image display apparatus 100 determines whether the video signal is a 3D video signal. The determination may be made using metadata of a data signal related to the input video signal.

If the input video signal is a 3D video signal, the 3D formatter 160 of the image display apparatus 100 analyzes the format of the 3D video signal in step S20. The format analysis may be made using metadata of a data signal related to the input 3D video signal.

If 3D format information about the 3D video signal exists in step S25, the 3D formatter 160 outputs the 3D format information to the formatter 175. The formatter 175 processes the input 3D video signal according to the 3D format information. Specifically, the formatter 175 generates multi-viewpoint images that can be combined to a 3D image from the 3D video signal and displays the 3D image on the display 180 in step S30.

On the other hand, in the absence of the 3D format information, the 3D format detector 161 of the 3D formatter 160 collects information about the input 3D video signal in step S35. This information may be title information about a content including the input 3D video signal.

The 3D format detector 161 transmits a 3D format request signal including the collected information to the server 300 in step S40. If the server 300 has 3D format information matching to the collected information in step S45, the server 300 transmits the 3D format information to the image display apparatus 100. The 3D format detector 161 outputs the 3D format information received from the server 300 to the formatter 175. The formatter 175 creates a 3D image by processing the received 3D video signal according to the 3D format information.

On the contrary, if there is no 3D format information matching to the collected information in the server 300 or if the image display apparatus 100 fails to download the 3D format information from the server 300, the user may select a 3D format on his own in step S50. The 3D formatter 160 outputs information about the user-selected 3D format to the formatter. The formatter 175 creates a 3D image by processing the input 3D video signal according to the received 3D format information.

On the other hand, if the input video signal is a 2D video signal in step S15, the 3D format generator 162 of the 3D formatter 160 collects information about the 2D video signal in step S60. This information may be title information about a content including the input 2D video signal.

The 3D format generator 162 transmits a depth information request signal including the collected information to the server 300 in step S65. In the presence of depth information matching to the collected information, the server 300 transmits the depth information to the image display apparatus 100. The 3D format generator 162 converts the 2D video signal to a 3D video signal of a predetermined format based on the depth information received from the sever 300 and outputs the 3D video signal to the formatter 175. The formatter 175 creates a 3D image by processing the received 3D video signal and displays the 3D image on the display 180.

If there is no depth information matching to the collected information in the server 300 or if the image display apparatus 100 fails to download the depth information from the server 300, the formatter 175 processes the input 2D video signal. Therefore, a 2D image is displayed on the display 180 in step S75.

Figure 9:
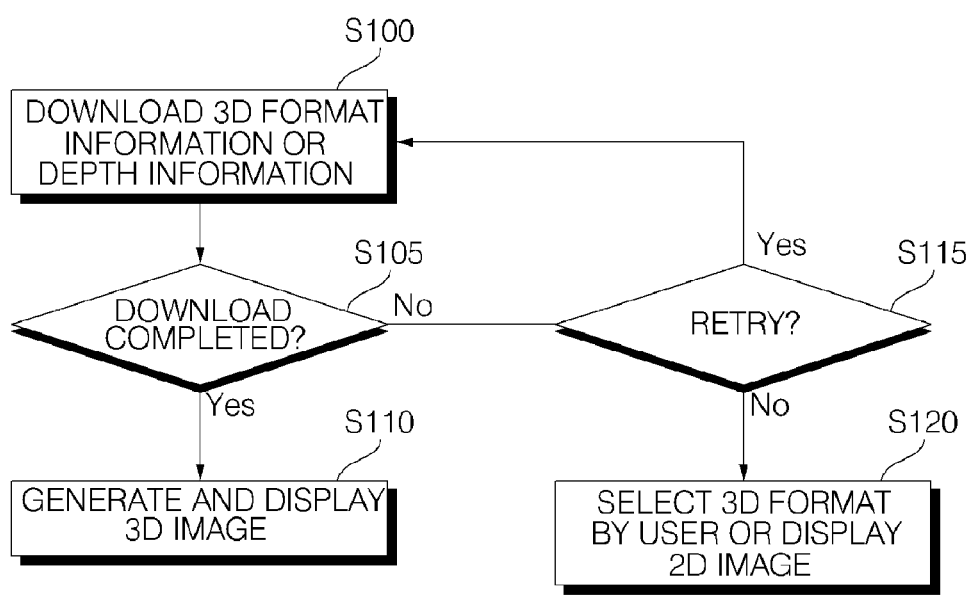

FIG. 9 is a flowchart referred to for describing the method for operating the image display apparatus 100 according the exemplary embodiment of the present invention.

Referring to FIG. 9, if the server 300 has 3D format information or depth information that matches to video signal-related information included in a 3D format request signal or a depth information request signal received from the image display apparatus 100, the image display apparatus 100 downloads the 3D format information or the depth information from the server 300 in step S100.

Upon completion of the download in step S105, the image display apparatus 100 generates and displays a 3D image based on the 3D format information or depth information in step S110.

If the image display apparatus 100 fails to download the 3D format information or the depth information from the server 300, the image display apparatus 100 may display a window prompting the user to determine whether to retry the download. If the user enters a retry command in the retry window in step S115, the image display apparatus 100 retries the download of the 3D format information or the depth information.

On the other hand, if the user does not enter the retry command, the image display apparatus 100 processes the 3D video signal according to a user-selected 3D format or displays a 2D image on the display 180 in step S120.

Figure 10:
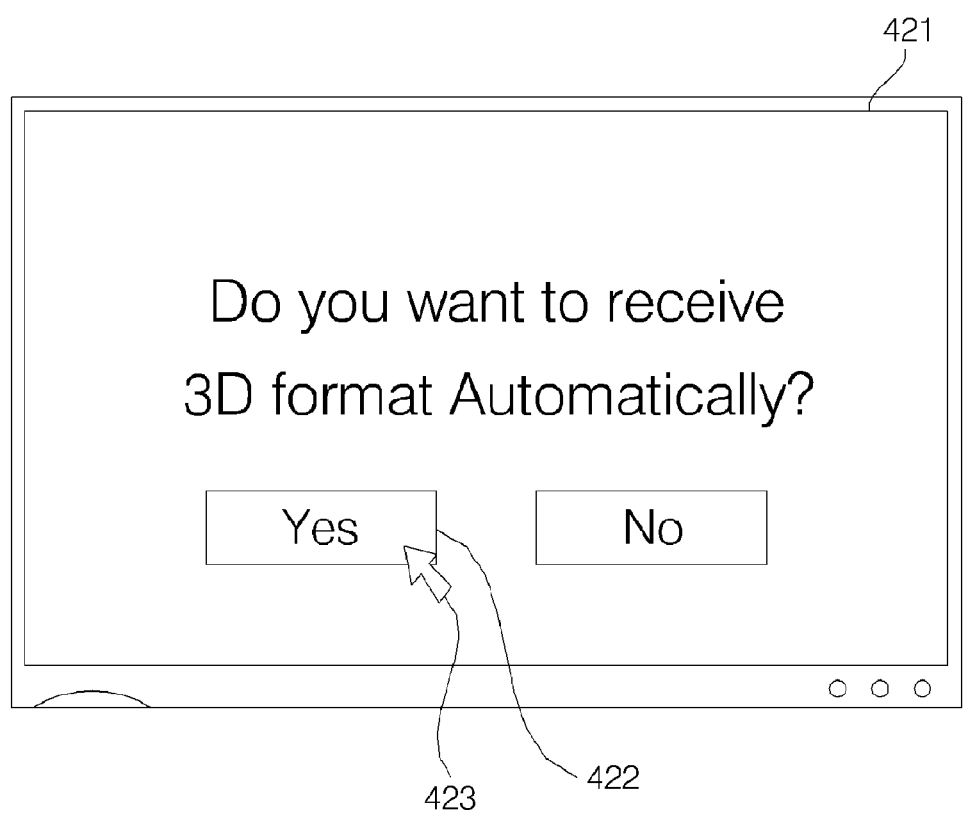
FIGS. 10 to 15 are views referred to for describing the method for operating the image display apparatus, illustrated in FIGS. 8 and 9.
Figure 11:
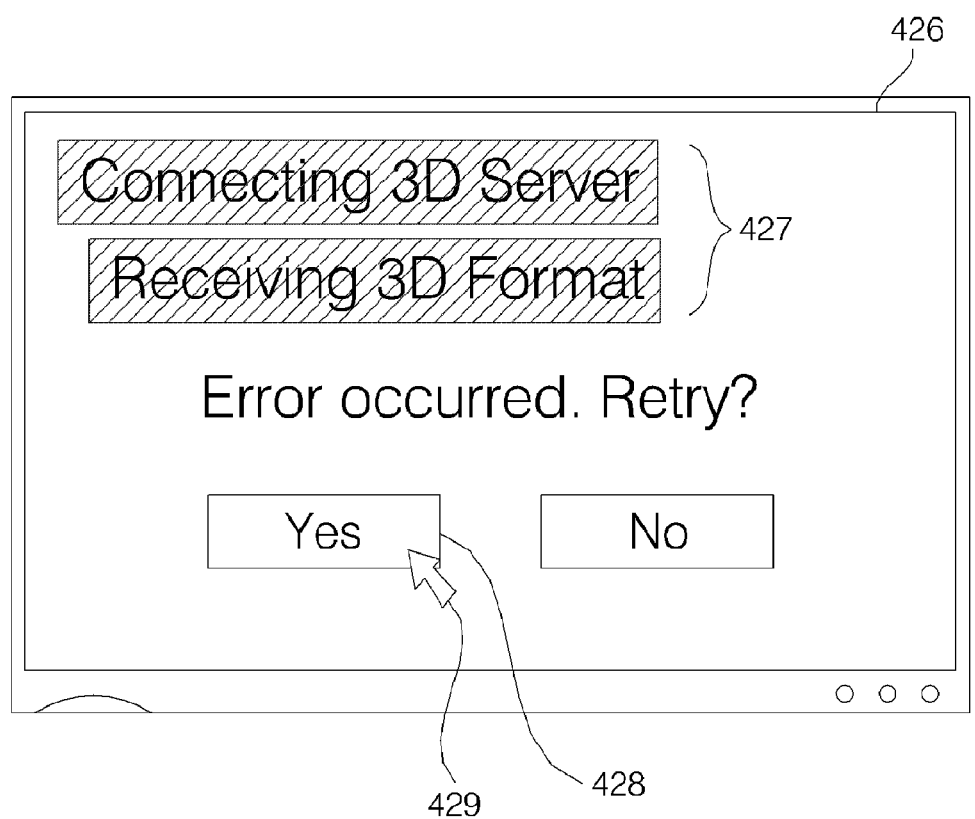
Figure 12:
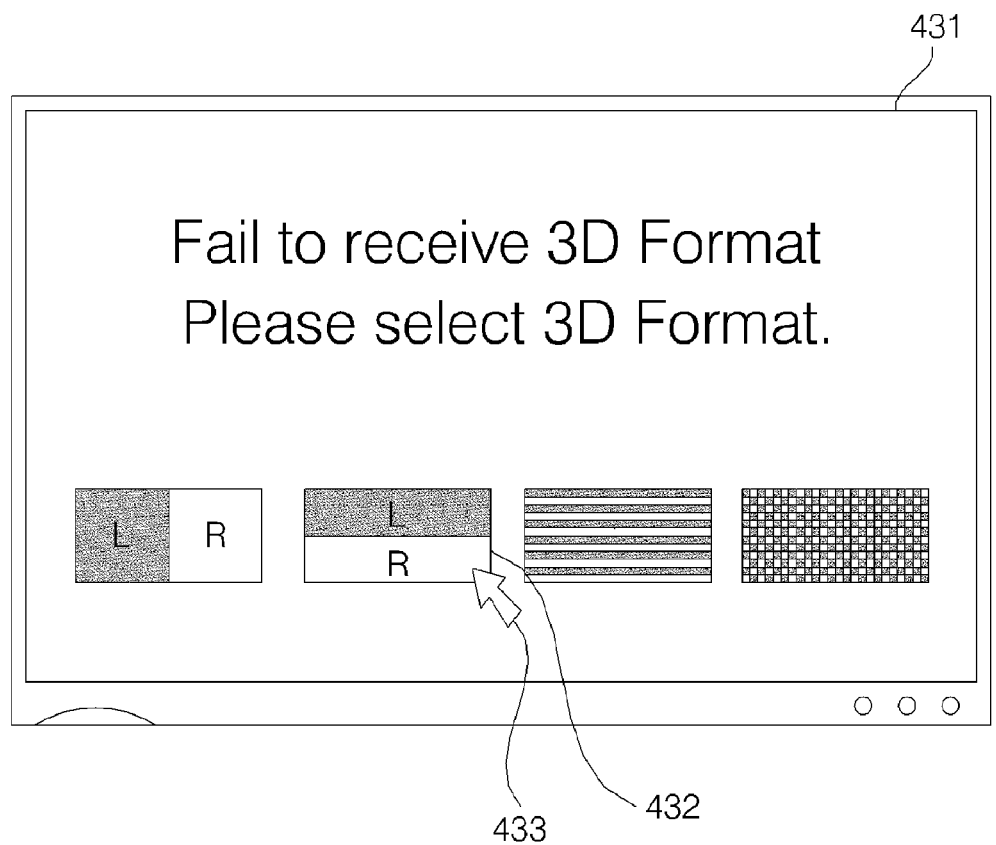

FIGS. 10, 11 and 12 illustrate screens displayed on the display 180 in the image display apparatus 100 according to an exemplary embodiment of the present invention FIG. 10 illustrates a screen 421 displayed on the display 190, when a 3D video signal with a non-identifiable 3D format is input to the image display apparatus 100. The user may select an icon 422 representing Yes using a pointer 423 corresponding to a signal transmitted by the remote controller.

Upon selection of the icon 422 representing Yes, the 3D format detector 161 of the 3D formatter 160 collects information about the input 3D video signal and transmits a 3D format request signal carrying the collected information to the server 300. The server 300 transmits 3D format information matching to the collected information included in the 3D format request signal to the image display apparatus 100.

FIG. 11 illustrates a screen 426 displayed on the display 180 of the image display apparatus 100 when an error occurs during transmission of the 3D format information from the server 300 to the image display apparatus 100. The screen 426 may display an icon 427 indicating a connection status between the image display apparatus 100 and the server 300 and a 3D format information transmission status. The user may select an icon 428 representing Yes using a pointer 427 corresponding to a signal transmitted by the remote controller on the screen 426.

Upon selection of the icon 428 representing Yes, the 3D format detector 161 of the image display apparatus retries the download of the 3D format information.

FIG. 12 illustrates a screen 431 displayed on the display 180 of the image display apparatus 100 when the download of the 3D format information from the server 300 is failed. The user may select a 3D format for the 3D video signal on the screen 431. The user may select an icon 432 representing the top/down format using a pointer 433 corresponding to a signal transmitted by the remote controller on the screen 431. The 3D format detector 161 outputs 3D format information corresponding to the selected icon 432 to the formatter 175. In this exemplary embodiment of the present invention, the formatter 175 creates a 3D image by processing the 3D video signal input to the image display apparatus 100 in the user-selected top/down format.

Figure 13:
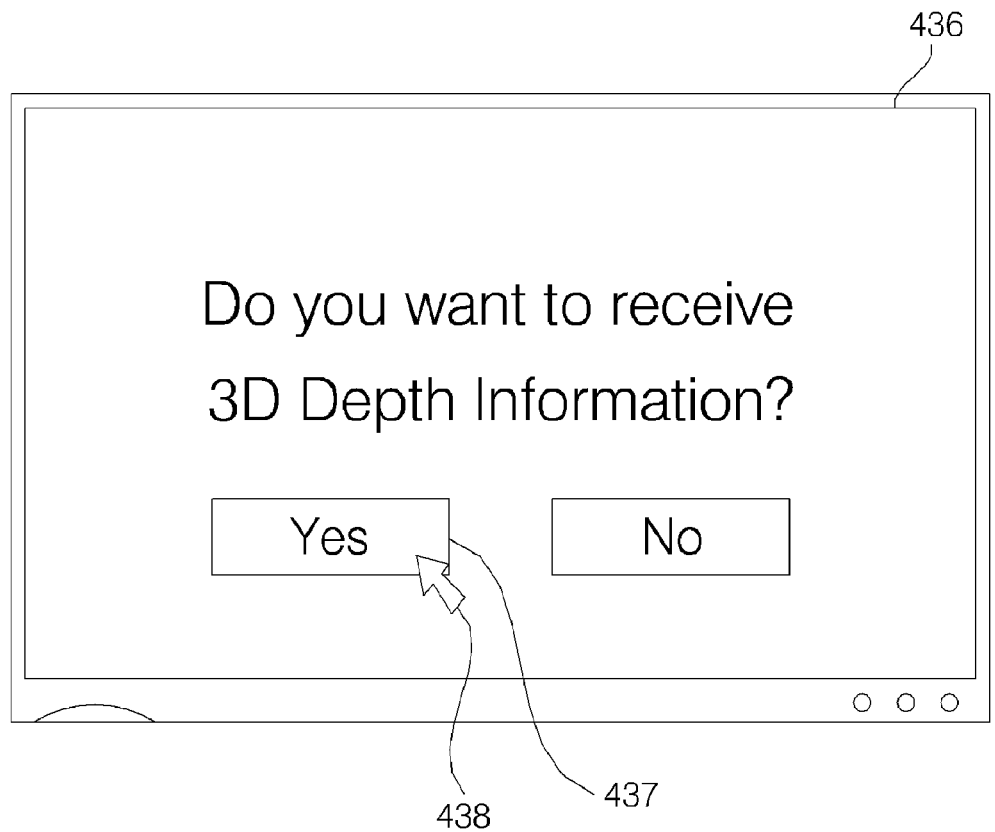
Figure 14:
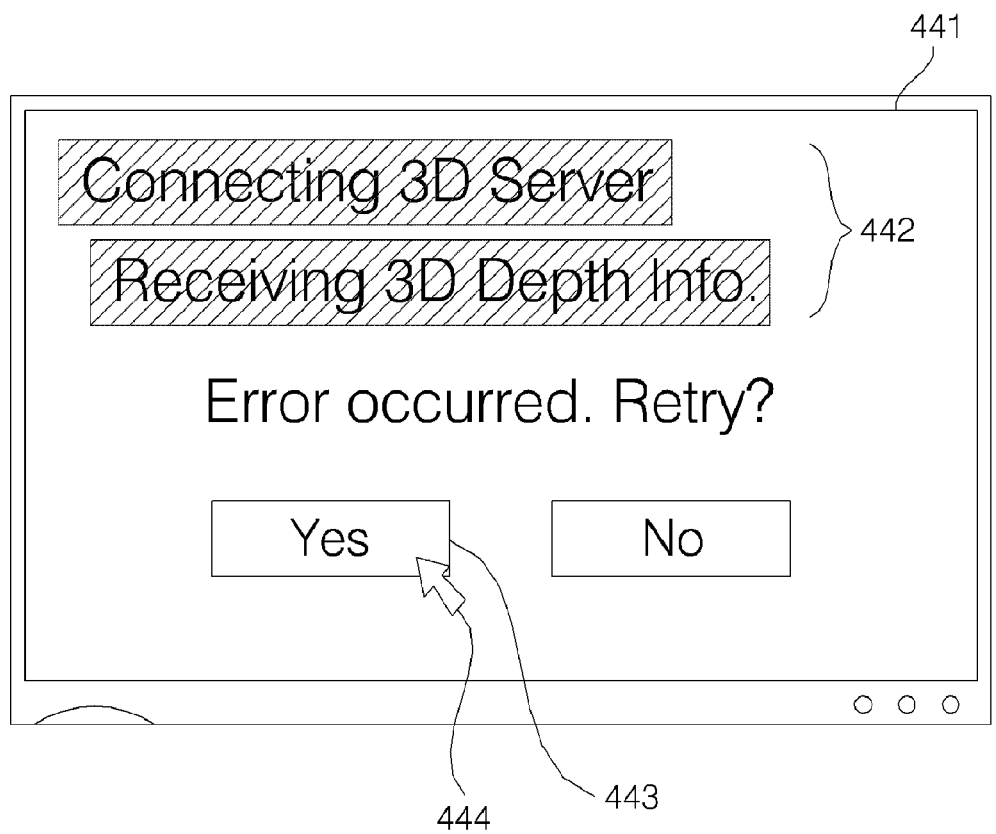
Figure 15:
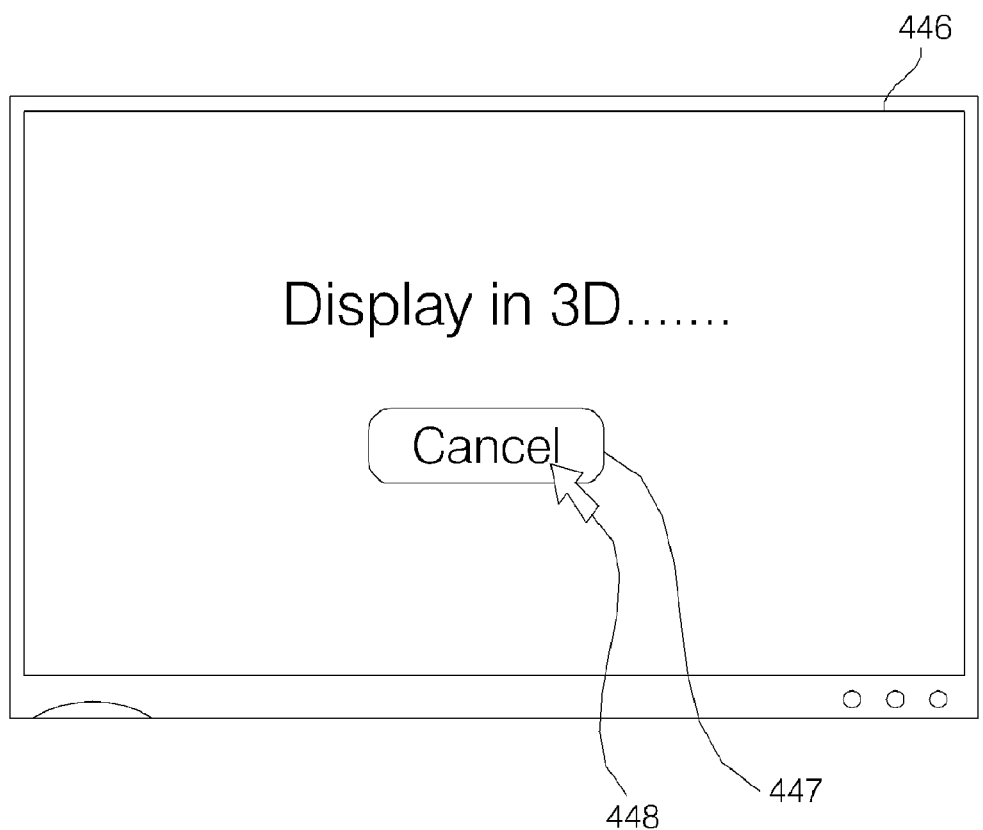

FIGS. 13, 14 and 15 illustrate screens displayed on the display 180 in the image display apparatus 100 according to another exemplary embodiment of the present invention.

FIG. 13 illustrates a screen 436 displayed on the display 180 of the image display apparatus 100 when a 2D video signal is input to the image display apparatus 100. The user may select an icon 437 representing Yes using a pointer 438 corresponding to a signal transmitted by the pointing device on the screen 436.

Upon selection of the icon 437 representing Yes, the 3D format generator 162 of the 3D formatter 160 collects information about the input 2D video signal and transmits a depth information request signal carrying the collected information to the server 300. The server 300 transmits depth information matching to the collected information included in the depth information request signal to the image display apparatus 100.

FIG. 14 illustrates a screen 441 displayed on the display 180 of the image display apparatus 100 when an error occurs during transmission of the depth information from the server 300 to the image display apparatus 100. The screen 441 may display an icon 442 indicating a connection status between the image display apparatus 100 and the server 300 and a depth information transmission status. The user may select an icon 443 representing Yes using a pointer 444 corresponding to a signal transmitted by the remote controller on the screen 441.

Upon selection of the icon 443 representing Yes, the 3D format generator 162 retries the download of the depth information. If the retry is failed a predetermined number of or more times, or if the user enters a retry No command to the image display apparatus 100, the formatter 175 processes the 2D video signal so that a 2D image is displayed on the display 180.

FIG. 15 illustrates a screen 446 displayed on the display 180 of the image display apparatus 100 when the 2D video signal is converted to a 3D video signal based on the downloaded depth information. As illustrated in FIG. 15, the image display apparatus 100 may display the screen 446 notifying that a 3D image will be displayed by 2D-3D conversion on the display 180.

The user may select an icon 447 representing Cancel using a pointer 448 corresponding to a signal transmitted by the remote controller on the screen 446. Upon selection of the icon 447 representing Cancel, the image display apparatus 100 displays a 2D image based on the 2D video signal.

The image display apparatus and the method for operating or controlling the image display apparatus according to the foregoing exemplary embodiments are not restricted to the exemplary embodiments set forth herein. Therefore, variations and combinations of the exemplary embodiments set forth herein may fall within the scope of the present invention.

The operation or control method of the image display apparatus according to the foregoing exemplary embodiments may be implemented as code that can be written on a computer-readable recording medium and can thus be read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

According to one or more of the aforementioned exemplary embodiments, the image display apparatus can display a 3D image including a 3D object in such a manner that the 3D object appears protruding toward a user. Even when receiving a 3D video signal with a non-identifiable format, the image display apparatus can display a 3D image referring to a server that stores 3D format information. In addition, despite input of a 2D video signal, the image display apparatus can display a 3D image referring to a server that stores depth information needed for 2D-3D conversion.

One or more embodiments described herein provide an image display apparatus, a method for controlling the image display apparatus, and an image display system, which can display a 3D image including a 3D object with depth so that the 3D object appears protruding toward a user.

One or more embodiments described herein also provide an image display apparatus, a method for controlling the image display apparatus, and an image display system, which can display a 3D image referring to 3D format information or depth information required for 2D-3D conversion stored in a server, despite input of a 3D video signal whose format cannot be identified or despite input of a 2D video signal.

According to one aspect, there is provided a method for controlling an image display apparatus, including determining a type of a video signal included in an input signal, determining whether 3D format information is included in the input signal, if the video signal is a 3D video signal, requesting 3D format information about the video signal to a server that stores 3D format information, if the input signal does not include the 3D format information about the video signal, and processing, upon receipt of 3D format information from the server in response to the 3D format information request, the video signal according to the 3D format information and displaying a 3D image based on the processed video signal.

According to another aspect, there is provided an image display apparatus including a display for displaying a 2D image or a 3D image including a 3D object, a 3D formatter for determining a type of a video signal included in an input signal and if the video signal is a 3D video signal about which 3D format information does not exist, outputting a 3D format information request signal requesting 3D format information about the video signal to a server that stores 3D format information, a network interface for transmitting the 3D format request signal received from the 3D formatter to the server, and a video processor for processing, upon receipt of the 3D format information from the server through the network interface in response to the 3D format information request signal, the video signal according to the 3D format information and displaying a 3D image based on the processed video signal on the display.

According to another aspect, there is provided an image display system including a server for storing 3D format information for each content, and an image display apparatus for requesting 3D format information about a content to the server, processing a 3D video signal included in the content according to 3D format information received from the server, and displaying a 3D image based on the processed 3D video signal.

According to a further aspect, there is provided an image display system including a server for storing depth information used for converting a 2D video signal included in a content to a 3D signal, and an image display apparatus for requesting depth information required for converting a 2D video signal included in a content to a 3D video signal to the server, converting the 2D video signal to the 3D video signal according to depth information received from the server, and displaying a 3D image based on the converted 3D video signal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling an image display apparatus, comprising:
    determining a type of a video signal included in an input signal;
    determining whether three-dimensional (3D) format information is included in the input signal, if the video signal is a 3D video signal;
    requesting 3D format information about the video signal to a server that stores 3D format information, if the input signal does not include the 3D format information about the video signal;
    processing, upon receipt of 3D format information from the server in response to the 3D format information request, the video signal according to the 3D format information and displaying a 3D image based on the processed video signal;
    displaying a window for determining whether to retry the receipt of the 3D format information, if the 3D format information is not received from the server;
    simultaneously displaying a plurality of 3D format items for the 3D video signal when the 3D format information is not received from the server after retrying the receipt of the 3D format information; and
    processing the video signal according to predetermined 3D format information and displaying a 3D image based on the processed video signal, the predetermined 3D format information corresponding to a selected 3D format item among the plurality of 3D format items by a 3D format selection command input to the image display apparatus,
    wherein the 3D format information requesting comprises collecting title information regarding a content including the 3D video signal, and transmitting the collected title information to the server,
    wherein the 3D format information from the server matches to the title information included in the received 3D format request signal,
    wherein the 3D format selection command input is performed by using a pointer Corresponding to a signal transmitted by a remote controller, and
    wherein the plurality of 3D format items includes a first 2D image including a left-eye image and a right-eye image which are vertically arranged and a second 2D image including a left-eye image and a right-eye image which are horizontally arranged.

2. The method according to claim 1, further comprising:
    receiving motion information from the remote controller;
    determining a movement of the remote controller based on the motion information; and
    calculating coordinates of the pointer,
    wherein the displaying pointer displays the pointer representing the movement of the remote controller according to the calculated coordinates.

3. The method according to claim 1, wherein the received 3D format information is 3D format information matching to the collected information among the 3D format information stored in the server.

4. The method according to claim 1, if the video signal is a 2D video signal, further comprising:
    requesting depth information about the video signal to a server that has depth information required for 2D to 3D conversion;
    converting, upon receipt of depth information from the server in response to the depth information request, the video signal to a 3D video signal according to the received depth information;

displaying a screen representing that the video signal is converted to a 3D video signal according to the received depth information;

displaying a 3D image based on the 3D video signal; and displaying a window for determining whether to retry the receipt of the depth information, if the depth information is not received from the server.

5. The method according to claim 4, wherein the depth information requesting comprises:

collecting title information regarding the content including the 3D video signal; and transmitting the collected title information to the server that stores the depth information.

6. The method according to claim 1, wherein the title information includes title, producer name, casting information, and Internet Movie DataBase (IMDB) information of the content.

7. The method according to claim 5, wherein the received depth information is depth information matching to the collected title information among the depth information stored in the server.

8. The method according to claim 4, further comprising displaying a 2D image based on the video signal, if the depth information is not received from the server in response to the depth information request.

9. An image display apparatus comprising:

a display configured to display a two-dimensional (2D) image or a three-dimensional (3D) image including a 3D object;

a 3D formatter configured to, if a video signal is a 3D video signal and 3D format information does not exist, output a 3D format information request signal requesting 3D format information about the video signal to a server that stores 3D format information;

a network interface configured to exchange the server and transmit the 3D format request signal received from the 3D formatter to the server if the video signal is the 3D video signal and 3D format information does not exist; and a video processor configured to process, upon receipt of the 3D format information from the server through the network interface in response to the 3D format information request signal, the video signal according to the 3D format information and to output a 3D image based on the processed video signal to the display, wherein the display displays a window for determining whether to retry the receipt of the 3D format information, if the 3D format information is not received from the server, and simultaneously displays a plurality of 3D format items for the 3D video signal when the 3D format information is not received from the server after retrying the receipt of the 3D format information, wherein the video processor processes the video signal according to predetermined 3D format information, and the predetermined 3D format information corresponds to a selected 3D format item among the plurality of 3D format items by a 3D format selection command input to the image display apparatus, wherein the 3D formatter collects title information regarding a content including the 3D video signal and outputs the collected title information in the 3D format request signal, wherein the 3D format information from the server matches to the title information included in the received 3D format request signal, wherein the 3D format selection command input is performed by using a pointer corresponding to a signal transmitted by a remote controller, and wherein the plurality of 3D format items includes a first 2D image including a left-eye image and a right-eye image which are vertically arranged and a second 2D image including a left-eye image and a right-eye image which are horizontally arranged.

10. The image display apparatus according to claim 9, further comprising:

an interface configured to receive motion information from a remote controller; and a controller configured to determine a movement of the remote controller based on the motion information, and to calculate coordinates of a pointer, wherein the display displays the pointer at the calculated coordinates.

11. The image display apparatus according to claim 9, wherein if the video signal is a 2D video signal, the 3D formatter outputs a depth information request signal requesting depth information about the video signal, for 2D to 3D conversion, to a server that stores depth information.

12. The image display apparatus according to claim 11, wherein upon receipt of the depth information from the server through the network interface in response to the depth information request signal, the 3D formatter converts the video signal to a 3D video signal according to the received depth information.

13. The image display apparatus according to claim 12, wherein the video processor displays a 3D image based on the converted 3D video signal on the display.

14. The image display apparatus according to claim 11, wherein the 3D formatter collects title information regarding the content including the 3D video signal and outputs the collected information in the depth information request signal.

15. The image display apparatus according to claim 9, wherein the title information includes title, producer name, casting information, and Internet Movie DataBase (IMDB) information of the content.

16. The image display apparatus according to claim 11, wherein if the depth information is not received from the server in response to the depth information request signal, the video processor processes the video signal so that a 2D image based on the video signal is displayed on the display.

* * * * *